United States Patent [19]

Sorensen et al.

[11] Patent Number: 4,582,087

[45] Date of Patent: Apr. 15, 1986

[54] ROTARY SLIDE FOR A HYDROSTATIC STEERING UNIT

[75] Inventors: Soren N. Sorensen; Jens Simonsen, both of Nordborg, Denmark

[73] Assignee: Danfoss A/S, Nordborg, Denmark

[21] Appl. No.: 735,766

[22] Filed: May 20, 1985

Related U.S. Application Data

[63] Continuation of Ser. No. 570,855, Jan. 16, 1984, abandoned.

[30] Foreign Application Priority Data

Jan. 21, 1983 [DE] Fed. Rep. of Germany ....... 3302001

[51] Int. Cl.[4] .......................... F16K 11/12; F15K 9/10
[52] U.S. Cl. ............................. 137/625.21; 91/375 A; 91/467
[58] Field of Search ........... 137/625.2, 625.21, 625.22, 137/625.23; 91/375 R; 418/61 B; 60/393, 384, 386

[56] References Cited

U.S. PATENT DOCUMENTS

| Re. 25,126 | 2/1962 | Charlson | 91/467 |
| 4,471,808 | 9/1984 | Thomsen et al. | 137/625.32 |
| 4,471,809 | 9/1984 | Thomsen et al. | 60/384 X |

Primary Examiner—Martin P. Schwadron
Assistant Examiner—John S. Starsiak, Jr.
Attorney, Agent, or Firm—Wayne B. Easton

[57] ABSTRACT

The invention relates to a rotary slide valve subassembly for a hydrostatic steering unit. The slide valve subassembly includes two concentric sleeves having near one end a plurality of circumferentially distributed axially extending slots which, in the neutral position, create a short circuit between the supply and discharge sides. The slots subdivide the corresponding sleeve sections into stays extending from the main sleeve sections. A construction is provided to avoid jamming of the sleeves by joining the stays of each sleeve section with a closed ring member and undercutting the inside diameter of the stays of the inner sleeve section to cause weakening thereof relative to the stays of the outer sleeve section.

5 Claims, 5 Drawing Figures

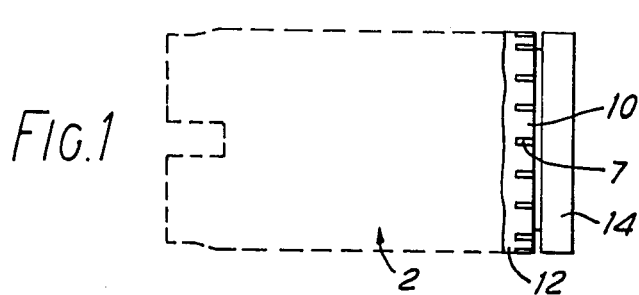
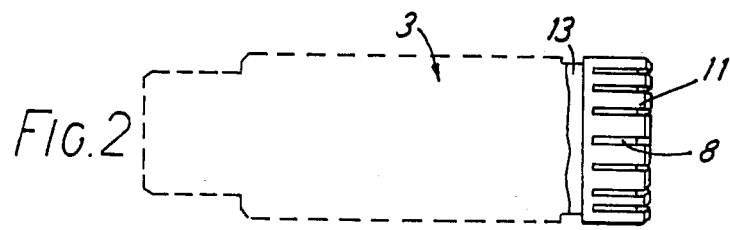
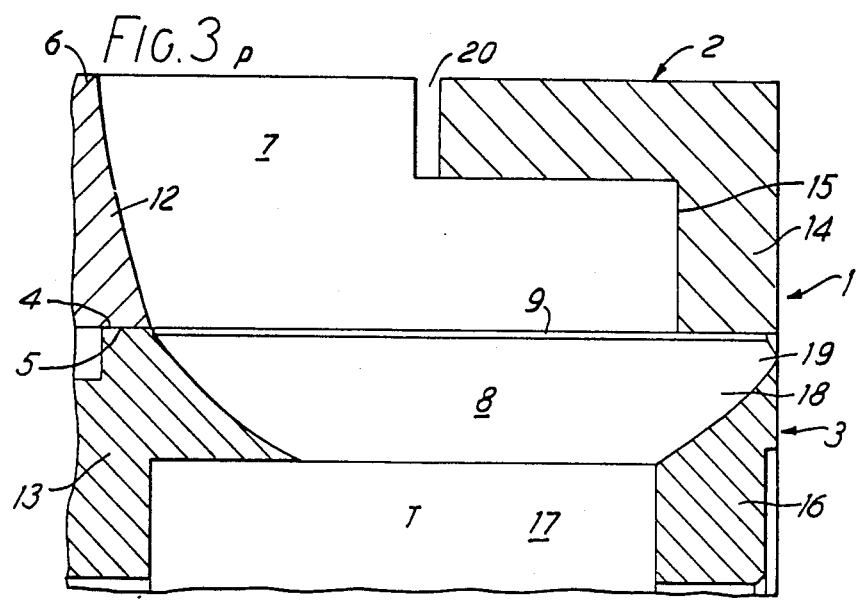
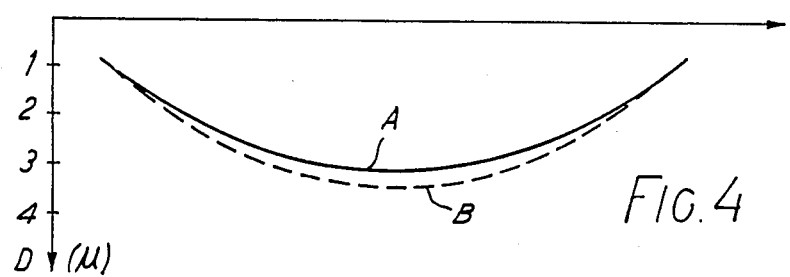

ROTARY SLIDE FOR A HYDROSTATIC STEERING UNIT

This application is a continuation of application Ser. No. 570,855 filed Jan. 16, 1984, now abandoned.

The invention relates to a rotary slide for a hydrostatic steering unit, comprising two concentric sleeves having near one end a plurality of circumferentially distributed axially extending slots which, in the neutral position, create a short-circuit between the supply and discharge side and sub-divide the corresponding sleeve section into stays extending from the main sleeve section.

Whereas in previously known rotary slides (US-PS Re. 25 126) the neutral position orifices producing the short-circuit between the supply and discharge side were in the form of radial bores, these neutral position orifices can, according to a previous suggestion (U.S. Pat. No. 4,471,808) be made in the form of axially extending slots.

In this way, a comparatively large cross-section with a comparatively small slot width is produced for the short-circuit path in the neutral position. The throttling losses in the neutral position are correspondingly low. In addition, the throttling effect is produced even after a short relative rotation. If shallow passages with a depth in the range of micrometers are provided between the adjoining peripheral surfaces of the two sleeves at both sides of the slots, intensive noise is avoided over the entire adjustment path.

Such a rotary slide works very well. However, if the operating pressure assumes elevated values, there is jamming between the two sleeves. This was also so for those embodiments sold by the applicants in which the free ends of the stays of the outer sleeve were connected to a closed ring which closed the slots at the end. If the pressure exceeded the order of 175 bar, the sleeves jammed. If it was desired to use more than 12 slots, jamming occurred at even lower pressures.

The invention is based on the problem of providing a rotary slide of the aforementioned kind in which the two sleeves will not jam even if higher pressures occur and/or the number of slots is increased.

This problem is solved according to the invention in that both sleeves each comprise at the end a closed ring by which the respective stays are connected and that the cross-section of the inner sleeve is weakened on the inside in the region of the slots.

In this construction, the stays of both sleeves each form a bending beam supported at both ends. Under the influence of pressure, this results firstly in less deformation of each stay than in the case of a bending beam which is supported only at one side. In addition, the bending lines of the stays of both sleeves follow a similar course; the greatest deflection is substantially in th middle between the two ends of the stays. Actually, the stays of the inner sleeve are stiffer than those of the outer sleeve because of their smaller diameter. However, by reason of the weakening of the inner sleeve in the zone of the slots, the stiffness of the stays of the inner sleeve is reduced to such an extent that their bending creates sufficient space for the bent outer stays, so that no jamming need be feared. Since weakening of the cross-section takes place at the inside of the sleeve, the functions of the two sleeves are also not influenced at the intermediate face and possibly at the outer periphery of the outer sleeve. In this way, the rotary slide can be operated without jamming at very high pressures, for example up to 210 Bar. This even applies if 18 instead of 12 stays are provided for the same dimensions of the sleeves.

The simplest type of weakening is for the inner sleeve to have a larger internal diameter in the region of the slots than at their main section and at their ring.

It is also favourable for the weakening to be so dimensioned that the bending of the stays of the inner sleeve is substantially the same in form and size to bending of the stays of the outer sleeve upon compression loading. In this way one ensures that the conditions at the intermediate face between the two sleeves remain the same over the entire pressure range. This is important particularly where, for the purpose of noise reduction, flat passages adjoin the slots. Their dimensions are therefore maintained over the entire pressure range. It is advisable for the slots of the outer sleeve to terminate at the inner periphery at a spacing from the end and for the slots of the inner sleeve to have at the outer periphery an extension of shallower depth going through up to the end.

The extension permits sufficiently large slotting tools to be employed. From a functional point of view, the extension open towards the end of the sleeve is harmless because it extends only over part of the depth of the slots and any pressure fluid discharging through it is throttled upon turning the sleeves out of the neutral position in the same way as the amount of fluid flowing out radially through the inner slots.

In a preferred embodiment, the inner sleeve is made in one piece and the weakening is produced by machining out in the region of the slots. In this case, the slots are produced by a small circular saw. A limited slot length will suffice because, by reason of weakening of the inner sleeve, only a wall of reduced thickness needs to be parted.

A preferred example of the invention will now be described in more detail with reference to the drawing, wherein:

FIG. 1 is a side elevation of the outer sleeve of a rotary slide according to the invention;

FIG. 2 is the side elevation of the inner sleeve of a rotary slide according to the invention;

FIG. 3 is a section through the slotted zone of the rotary slide formed from the FIGS. 1 and 2 sleeves;

FIG. 4 is a graph of the characteristic bending lines at a predetermined pressure and FIG. 5 is a sectioned view of a hydrostatic control unit for vehicle steering systems or the like of the type in which the supply to exhaust short circuiting valving arrangement of the present invention may be incorporated.

Figure 5:
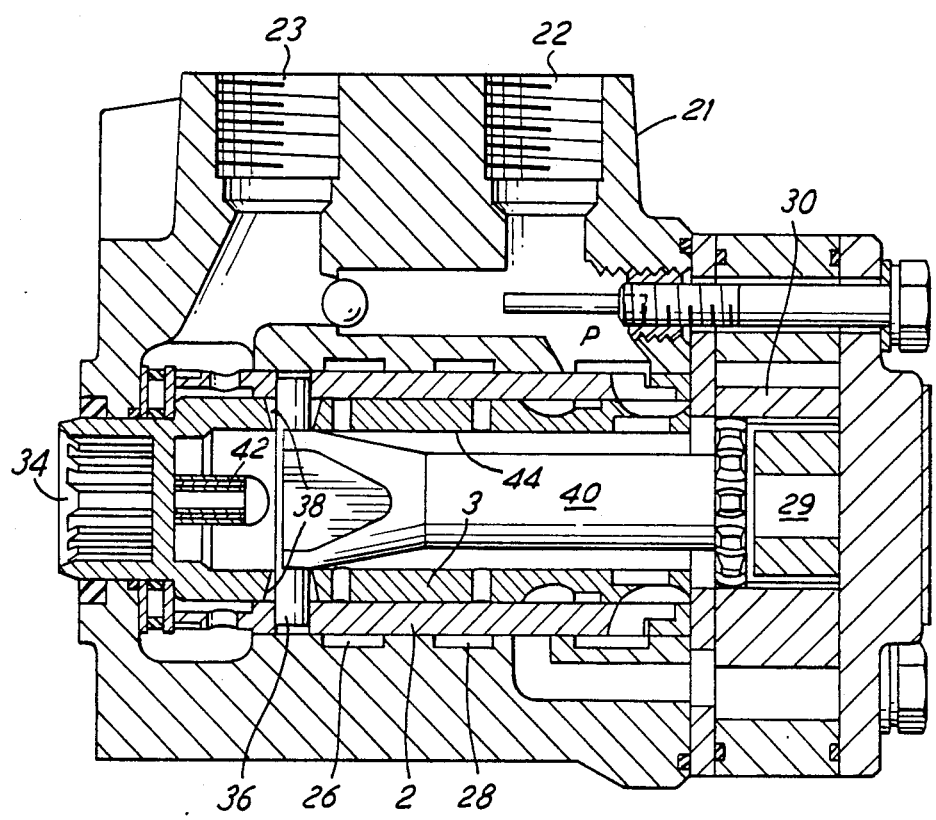

The rotary slide 1 partially illustrated in FIG. 3 and shown incorporated in a known type of hydrostatic steering control unit shown in FIG. 5 comprises an outer sleeve 2 and an inner sleeve 3 inserted therein. These sleeves are rotatable relatively to each other in both directions through a limited angle against the force of a neutral position spring 42. The outer sleeve 2 is continuously rotatable relatively to a housing bore. In the regions shown in broken lines in FIGS. 1 and 2, the sleeves comprise control orifices so that different valve functions such as those known from US-PS Re. 25 126 are produced on the one hand between the outer periphery 4 of the inner sleeve 3 and the inner periphery 5 of the outer sleeve 2 as well as on the other hand between the outer periphery 6 of the outer sleeve 2 and the housing bore.

The outer sleeve 2 has near the one end eighteen axially extending slots 7 which are uniformly distributed circumferentially. In the same region, the inner sleeve 3 comprises eighteen axially extending slots 8 which are circumferentially distributed in the same way. In the neutral position, these slots are in registry as shown in FIG. 3 and form a short-circuit between the supply side at pump pressure P and the discharge side at tank pressure T. Shallow passages 9 adjoin both sides of the slots at the outer periphery 4 of the inner rotary slide 3 in the manner described in U.S. Pat. No. 4,471,808. The passages are formed by a slight removal of material. Their width extends at least over the length of the slots. Their length is less than half the spacing between adjacent slots. When the sleeves 2 and 3 are turned relatively to each other, pressure fluid can flow from slot 7 through the passage 9 with corresponding throttling to the passage 8 as long as the slots 7 and 8 are still interconnected by the passage 9. Upon further rotation, the slot 7 is closed by the outer peripheral surface 4 of the inner rotary slide. In the case of the outer sleeve 2, eighteen stays 10 remain between the slots 7 whereas eighteen stays 11 remain between the slots 8 of the inner sleeve. The stays 10 are fixed to the main section 12 of the outer sleeve 2 and the stays 11 are fixed to the main section 13 of the inner sleeve 3. A ring 14 of L cross-section is located at the end of the outer sleeve 2. This ring is secured to the stays 10 by soldering along the L-shaped groove 15. At the free end of the inner sleeve 3, a closed ring 16 is made in one piece with the remainder of the sleeve so that the stays 11 are fixed to this ring 16.

A machined recess 17 leading to weakening of the sleeve in the region of the slots 8 is provided at the inner circumference of the inner sleeve 3. By reason of the smaller diameter of the inner sleeve 3, the stays 11 therefore not only have a smaller breadth than the stays 10 of the outer sleeve 2 but also a shallower radial height than the stays 10.

FIG. 4 shows very much simplified characteristic bending lines. The bending D in $\mu$ is shown over the length of the stays illustrated in FIG. 3. The stays 10 as well as the stays 11 form bending beams on both sides, of which the bending lines tend to conform to the curve A. If the slots 8 were to be made at the same radial height as the slots 7, the stays 11 would exhibit much less bending than that corresponding to the curve A. By reason of the fact that the cross-section of the inner sleeve 3 is weakened by the recess 17 in the region of the slots 8, the bending line of the stays 11 can correspond in form and size to curve A. It is most favourable if the inner as well as the outer stays have the same bending line for all operating conditions because in that case the size of the passages 9 is independent of the pressure P. However, proper functioning is also ensured if the stays 11 bend somewhat more, as is shown by curve B.

During production, the slots 7 may be produced by a circular saw. The ring 14 may be pushed on and soldered. The inner sleeve can be made in one piece because the slot height is substantially less by reason of the recess 17. One can therefore produce the slots 8 with a circular saw of small diameter. It is no hardship that the slot 8 has an extension 18 extending up to the end and therefore leaves a small aperture 19 open at the end. This is because the slots 7 terminate at a spacing from this end so that the throttling function of the passage 8 is not detrimentally influenced upon turning out of the neutral position.

If in operation pressure fluid is supplied at the pressure P, it flows from the outer periphery 6 to the outer sleeve 2 and over an annular groove 20 between the ring 14 and the stays 10 into the slots 7. From the slots 8, the predominant part of the pressure fluid reaches the turned recess 17. The proportion leaving through the aperture 19 is very small.

One therefore obtains a construction with sleeves that are free from jamming. The free cross-section of the short-circuit path in the neutral position can be made substantially larger because more slots are provided and the slots can also be made longer without the danger of disadvantages caused by the bending. The noise behaviour is excellent. because the passages 9 substantially retain their shape over the entire pressure range and, as are the peripheral surfaces, can be made very accurately because the rings prevent deflection of the stays during grinding. Further, there are no difficulties to make the annular passage connected to the pump somewhat wider axially at the outer periphery of the outer sleeve 2 because the heavier pressure load on the stays cannot give rise to disadvantageous jamming. In FIG. 5 there is shown a hydrostatic control unit for vehicle steering systems or the like of the type disclosed in Re. 25,126 in which the supply to exhaust short circuiting valving arrangements of the present invention may be incorporated. This control unit has a housing with inlet and outlet ports 22 and 23 and motor ports 26 and 28 which are connectable to piston and cylinder type servomotor (not shown) of the type used for actuating a vehicle steering linkage.

The control unit has a gerotor type metering motor 29 with an orbitable and rotatable star gear 30 and a stationary ring gear 32 which forms part of the housing.

The inner sleeve sleeve 3 has a splined end section 34 to which a steering member (not shown) is attachable. A transversely extending drive pin 36 is fixedly connected to outer sleeve 2 and extends through openings 38 in inner sleeve 3. The openings 38 are larger than the diameter of pin 36 to allow lost or relative movement between sleeves 2 and 3. A cardan shaft 40 extends between the pin 36 and the star gear 30 to provide a driving connection between the outer sleeve 2 and the metering motor 29. The sleeves 2 and 3 are held in a neutral position by spring means 42 between the sleeves which allows slight movements of the inner sleeve 3 relative to the outer sleeve in both rotational directions to provide for the left and right turn operating positions.

The right side of the outer periphery 6 of the outer sleeve 2 is in constant fluid communication with the inlet pressure P in the inlet port 22 and the right side of the inner periphery 17 of the inner sleeve 3 is in constant fluid communication with the tank pressure T in the outlet port 23 via the central bore 44 of the inner sleeve.

In operation, when the inner sleeve 2 is in its neutral position relative to the outer sleeve 3, the slots 7 and 8 of the outer and inner sleeves are in alignment and there is a short circuiting of the pressure fluid in inlet port 22 to the outlet port 23 through the bore 44 of the inner sleeve. When the inner sleeve 3 is turned one way or the other relative to the outer sleeve 2, the slots 7 and 8 go out of alignment to cause blocking of the flow to the outlet 23. The pressurized fluid in inlet port 22 is then directed by known incorporated valving to one or the other of the motor ports 26 or 28 via the metering motor 29 and fluid is exhausted from the other of the motor ports through the exhaust port 23.

I claim:

1. A rotary slide valve subassembly for a hydrostatic steering unit, comprising, outer and inner concentric sleeve members each having a main section having axially extending stays extending therefrom formed by a plurality of circumferentially distributed axially extending slots, said slots of said members being registerable in a neutral position to form short circuiting paths from the exterior of said outer sleeve member to the interior of said inner sleeve member, each of said sleeve members having a closed end ring connected to said stays thereof, said inner member having a radial thickness in the region of its said stays so that the radial thicknesses of said stays of said inner member are less than the radial thicknesses of said stays of said outer member so that for the operating fluid pressures to which said members are subjected the bending of said stays of said inner member is of the same magnitude as the bending of said stays of said outer member to avoid jamming of said members.

2. A rotary slide valve subassembly according to claim 1 characterized in that said inner sleeve member has a larger internal diameter in the region of its said stays than at its main section and its said ring, said larger diameter being a parameter which determines said radial thicknesses of said stays of said inner member.

3. A rotary slide valve subassembly according to claim 1 characterized by said inner sleeve member having an annular recess in the region of its said stays dimensioned so that bowing of said stays of said inner sleeve member on compression loading substantially the same in form and size as the bowing of said stays of said outer sleeve member.

4. A rotary slide valve subassembly according to claim 1 characterized in that said slot of said outer sleeve member terminal radially at the outer periphery of said inner member adjacent said end ring of said outer member.

5. A rotary slide valve subassembly according to claim 1 characterized in that said slots of said inner sleeve member in the region of said ring thereof become shallower in the axial direction in which said slots extend.

* * * * *